Feb. 28, 1956          G. SMITH          2,736,629
CHART DRIVE APPARATUS
Filed May 25, 1953          2 Sheets-Sheet 2
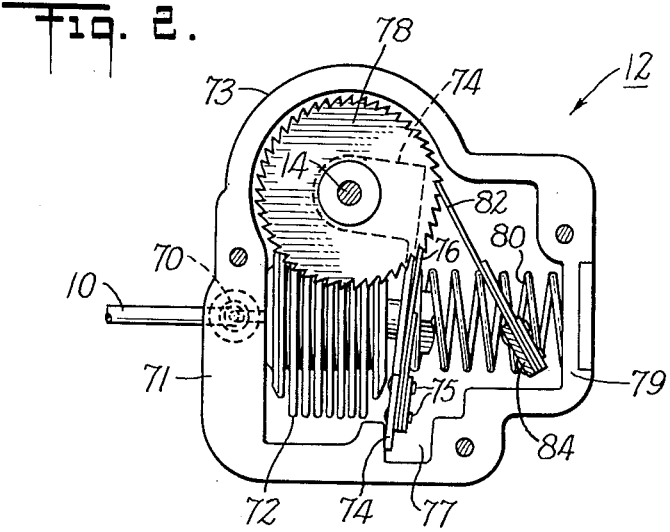
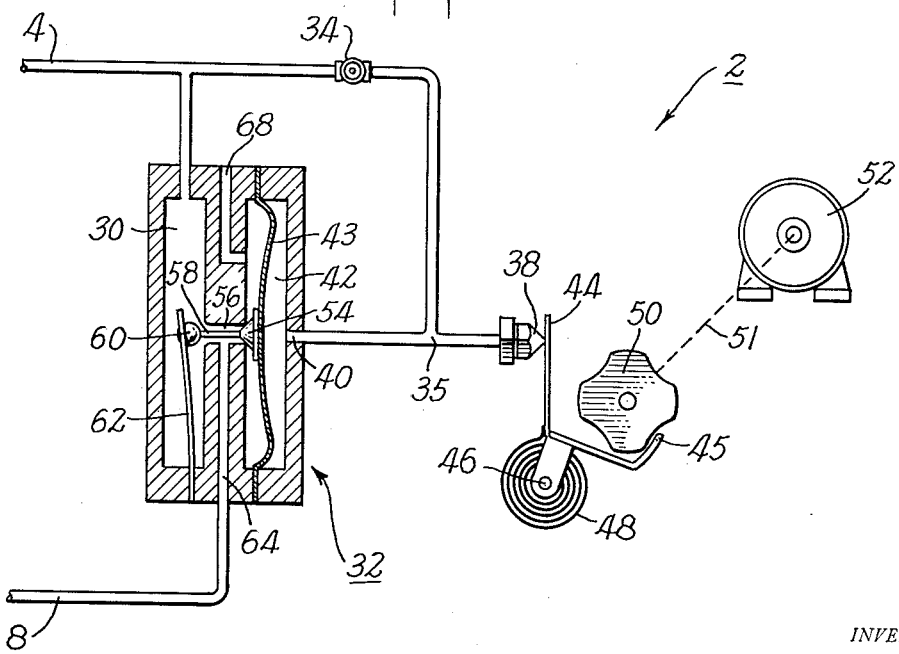
INVENTOR.
Graydon Smith

# United States Patent Office 2,736,629
Patented Feb. 28, 1956

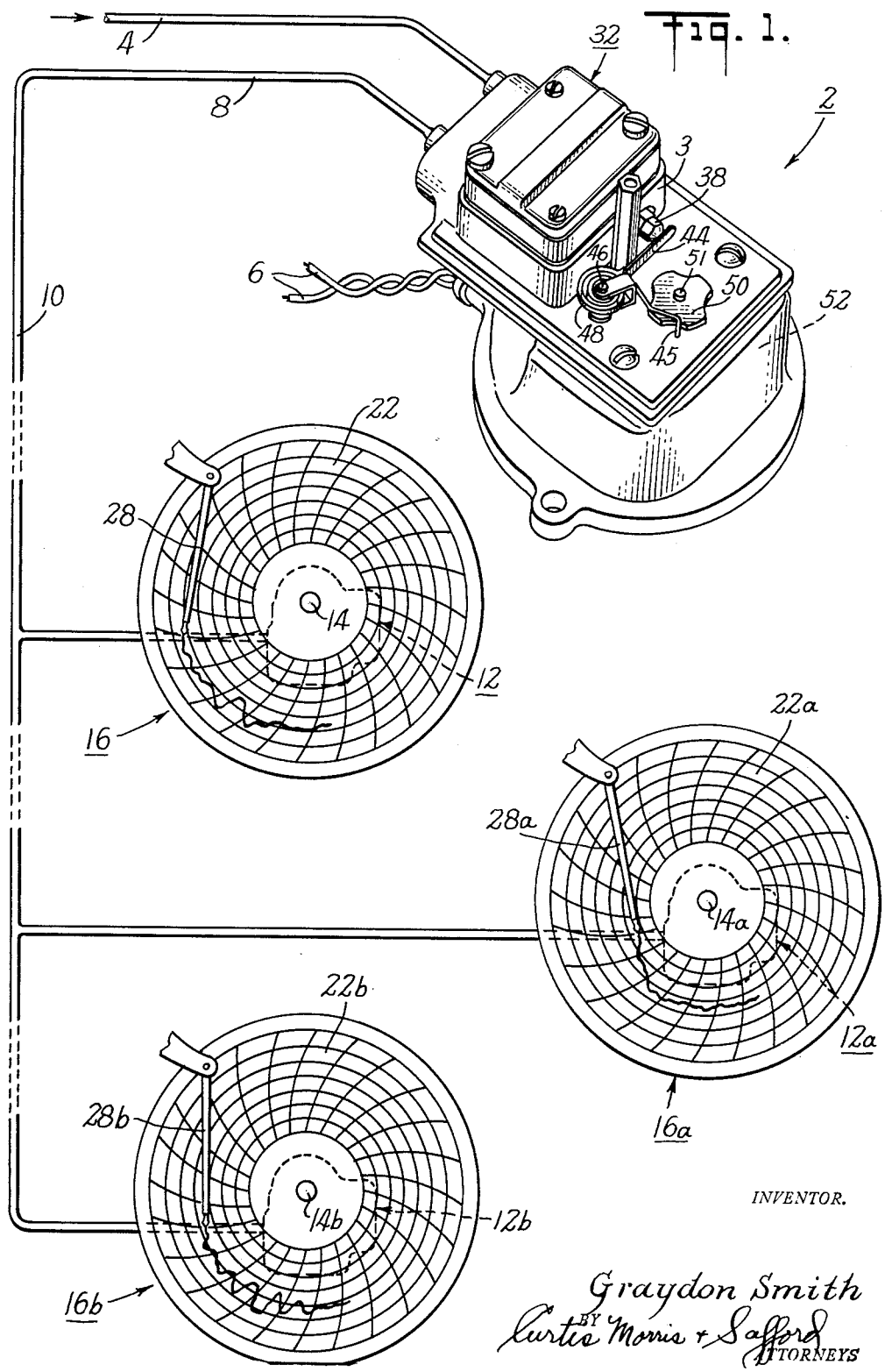

2,736,629

CHART DRIVE APPARATUS

Graydon Smith, Concord, Mass., assignor to The Foxboro Company, Foxboro, Mass., a corporation of Massachusetts Application May 25, 1953, Serial No. 357,059

4 Claims. (Cl. 346—44)

This invention relates to chart drive mechanisms for use in industrial recording apparatus, and more particularly to a system for synchronously driving a number of recording charts from an energizing source of fluid pressure.

For proper control of many industrial processes it has been found necessary to record continuously the variations of certain conditions such as temperature, flow rate, etc. Such information is commonly imprinted on a paper chart, which is usually in the form of a disc or rolled strip, by means of a pen whose position is automatically varied in accordance with fluctuations in the condition being measured. In order that the recorded condition variations be associated correctly with their time of occurrence, the paper chart is generally marked with appropriate hour or minute designations, is positioned accurately at the initiation of the recording period, and is driven by a constant speed mechanism at the rate required to assure correspondence between "chart" time and actual time.

The accuracy of the final record is, of course, dependent upon the precision of the drive mechanism. For that reason, early recording systems generally employed relatively delicate clock-type drive mechanisms, which derived their motive energy from a wound spring. For small installations this approach was satisfactory, but for processes requiring a large number of recorders, the problems of periodic manual winding and frequent adjustments made such an arrangement very undesirable. Consequently, the mechanical chart drive systems were soon generally supplanted by electrical drive systems, usually of the synchronous motor type.

The synchronous motor chart drive represented a substantial advance over the mechanical clock-type drive. No adjustments were required, the drive energy was obtained from readily available electric power, and the timing accuracy was extremely high.

In certain types of industrial processes, however, particularly those involving ignitable vapors or compositions, the electric chart drive systems presented a serious problem. Sparking and arc-over in and around the synchronous motor could easily set off dangerous explosions under ordinary circumstances, and in such situations it is necessary to take extra precautions. The most common of such precautions has been to design the synchronous motor to be "explosion-proof." Essentially, this is accomplished by placing a completely sealed housing around each motor, to prevent explosive mixtures from coming in contact with the potential spark areas. This solution to the problem adds considerably to the costs of manufacture, and for industrial processes requiring large numbers of recorders it represents a substantial increase in total instrumentation investment. Furthermore, the possibility of imperfections in the sealed housing is ever present so that complete safety from spark-induced explosions has not been thereby achieved.

It is a principal purpose of the present invention to provide an improved "explosion-proof" chart drive system for recorders; one which does not require attention from the plant maintenance staff, is economical to manufacture, and yet retains the accuracy of the synchronous motor chart drive systems hitherto used. A preferred embodiment of this invention is founded on the use of a single synchronous motor, which can either be located in a non-explosive area of the plant or can be housed in an explosion-proof manner. This motor is used to key a pneumatic pulse transmitter at periodic intervals, and the generated pressure pulses are then distributed to the various recorders where receiver units convert the pulses into mechanical motion for driving the charts.

Other objects and advantages will be in part obvious and in part pointed out in the following specification taken together with the accompanying drawings, in which:

Figure 1 is a diagram representing a pneumatic chart drive system, partly schematic;

Figure 2 is a plan view of a pneumatic pulse receiver with one cover removed; and Figure 3 is a schematic representation of a typical transmitter unit.

In Figure 1, a pneumatic pulse transmitter generally indicated at 2, and which may be located in any convenient position in an industrial plant, is connected to a supply of air or gas pressure (not shown) by a supply pipe 4. Electrical energy is supplied to the transmitter 2 through a pair of wires 6 which are connected to the usual power mains, and is used to drive a synchronous motor 52 contained within the transmitter 2. Pulses of gas pressure issue periodically from the transmitter 2 through an output signal conduit 8 and enter a distribution conduit 10 by which they are carried to a number of individual receiver units generally indicated at 12, 12a and 12b. Inside of each receiver unit is a mechanism (shown in Figure 2) which includes a bellows-driven ratchet wheel, and which produces a rotary motion on an output shaft 14 in response to pressure pulses received from the transmitter unit 2.

To assist in picturing this arrangement, the outlines of several recorder units 16, 16a and 16b have been shown adjacent the receiver units 12, 12a and 12b respectively. The output shaft 14, 14a, 14b of each pulse receiver 12, 12a, 12b is connected by a suitable linkage to the drive shaft of a disc-type recording chart 22, 22a, 22b. A movable pen 28, 28a, 28b under the control of a measurement system (not shown), inscribes measurement data on the chart 22, 22a, 22b as it passes thereunder in accordance with motion imparted by the pulse receiver output shaft 14, 14a, 14b.

Referring now to Figure 1 in more detail, in the base of the pulse transmitter unit 2 is a synchronous motor 52, the rotor shaft of which drives a cam 50 through an internal gear-reduction mechanism (not shown). The peripheral surface of this cam 50 is engaged in pressure contact with a cam follower 45 attached to the flapper arm 44, which is pivoted about a pin shaft 46 and urged by a spring 48 towards the nozzle 38, shown protruding from a wall of the housing 3.

The nozzle 38 is positioned so that its tip, containing an exit mouth, is adjacent to and very nearly touching the flapper arm 44 when the cam follower 45 is riding on a raised portion of the cam 50. When the cam 50 rotates so that the cam follower 45 is riding on one of the cut-back portions of the cam (as shown in the drawing), the flapper arm 44 moves closer to and touches the nozzle 38, and effectively seals off the escape of gas therefrom. Thus, during rotation of the cam, the mouth of the nozzle 38 is alternately closed and opened, which in turn alternately builds up and dissipates the back pressure in the nozzle passage contained within the housing 3, as will be explained in more detail hereinafter. Mounted on top of the housing 3 is the main body of a pneumatic relay 32, within which are contained various chambers, passages, valves, etc., generally required for pneumatic relay operation.

The pneumatic relay, generally indicated in Figure 1 at 32, may be any one of the types known in the art having gain and response characteristics suitable for the purpose, such as the one described in detail in Patent No. 2,631,570 issued to Bowditch on March 17, 1953. In Figure 3, for purposes of illustration, a suitable relay is shown schematically along with the other operating elements of the pulse transmitter unit.

In this particular arrangement, the supply pipe 4 feeds gas under pressure to a supply chamber 30 and to a restrictor 34. The downstream side of the restrictor 34 is connected to a T junction 35, one arm of which is terminated in the nozzle 38 and the other arm of which is connected through a small passage 40 to a diaphragm chamber 42.

Positioned perpendicularly and adjacent to the mouth of the nozzle 38 is the flapper arm 44 which, as previously described, is pivoted for movement about a pin shaft 46 and urged toward the nozzle 38 by a flapper spring 48. Movement of the flapper arm 44 is controlled by rotation of the cam 50, having four raised portions, and which is driven through suitable linkages 51 by the synchronous motor 52. As the cam 50 rotates, so as to bring one of its raised portions into contact with the cam follower 45, the flapper arm 44 is forcibly rotated about the pin shaft 46 against the tension of the flapper spring 48 and away from contact with the mouth region of the nozzle 38. Further rotation of the cam 50 removes this raised portion from contact with the cam follower 45, thereby allowing the flapper arm 44 to return, under the tension of the flapper spring 48, to its original position adjacent to the mouth of the nozzle 38.

When the cam 50 is in a position to open the mouth of the nozzle 38 to atmosphere, the pressure on the downstream side of the restrictor 34 will be low and very nearly atmospheric, since the restrictor 34 allows a gas flow rate sufficient only to create a nominal pressure drop across the nozzle 38 in escaping to the atmosphere. Consequently, the pressure in the diaphragm chamber 42 will also be nearly atmospheric because of the common connection from the nozzle 38 through the small passage 40 to the diaphragm chamber 42.

Within the diaphragm chamber 42 is suspended a (resilient) diaphragm 43 the central portion of which is urged toward the small passage 40 by its own natural spring tension, and to the center of which is secured an exhaust valve body 54 and an extension of a valve stem 58 movably positioned within a communicating passage 56. The diaphragm 43 is designed so that the force produced by atmospheric pressure in the diaphragm chamber 42 is insufficient to deflect the diaphragm rearwardly (i. e., toward the communicating passage 56) against its own natural spring tension. Therefore, when the flapper arm 44 is positioned so as to uncover the mouth of the nozzle 38, the exhaust valve body 54, which is secured to the valve stem 58, will be positioned away from seating contact with the exit of the communicating passage 56.

At the entrance to the communicating passage 56 is a ball valve 60, which is urged toward seating contact with the communicating passage 56 by a spring 62. When the diaphragm 43 is in its position closest to the small passage 40 (as when there is atmospheric pressure in the diaphragm chamber 42), the valve stem 58 extends almost to, but does not quite touch, the ball valve 60. Hence in this condition, the ball valve 60 effectively seals off the supply chamber 30 from the communicating passage 56, and prevents the relatively high pressure gas in the supply chamber 30 from passing through the communicating passage 56 to the output passage 64.

When the cam 50 rotates so as to allow the flapper arm 44 to close off the nozzle 38 (as shown in the drawing), the pressure on the downstream side of the restrictor 34 rises sharply to a value virtually equal to the pressure in the supply pipe 4, since there no longer can be any substantial rate of gas flow through the restrictor 34. This pressure, which is communicated also to the diaphragm chamber 42, is of sufficient magnitude to deflect the diaphragm 43 rearwardly against its natural spring tension, and by so doing forces the exhaust valve body 54 into seating contact with the exit of the communicating passage 56. Additionally, the valve stem 58 is caused thereby to move through the communicating passage 56, and to make contact with and press the ball valve 60 away from the entrance to the communicating passage 56 against the tension of the spring 62. Consequently, in this condition, the relatively high pressure gas in the supply chamber 30 is free to flow around the ball valve 60, through the communicating passage 56 and the output passage 64, to the output signal conduit 8. However, flow from the communicating passage 56 to the diaphragm chamber 42 is prevented by the valve body 54.

When the cam 50 rotates still further so as to force the flapper arm 44 away from the nozzle 38, the gas pressure in the diaphragm chamber 42 again returns to very nearly atmospheric, for the reasons given hereinabove. The diaphragm 43 thereupon moves toward the connecting passage 40 under its own spring tension, thereby unseating the exhaust valve body 54 and allowing the ball valve 60 to seat against the entrance to the communicating passage 56. The supply chamber 30 is thereby sealed off from the output passage 64, and the pressure which had built up in that passage during the previous condition is dissipated around the exhaust valve body 54, into the diaphragm chamber 42, and escapes to atmosphere through an exhaust flue 68.

Thus, rotation of the cam 50 causes pulses of relatively high-pressure air to be generated and distributed at periodic intervals, the duration and periodicity of the pulses being determined by the shape and rotational velocity of the cam. In the preferred embodiment, the air supply pressure is approximately 20 p. s. i., the pulses occur about every 15 seconds, and each pulse lasts for at least several seconds.

With reference now to the pulse receiver unit 12 shown in detail in Figure 2, an input passage 70, inset into a wall 71 of the receiver housing 73, is provided for coupling with the distribution conduit 10. This input passage 70 is connected by an internal communicating passage (not shown) to a bellows 72, which may be any one of various types known in the art having suitable pressure rating and expansion characteristics. In response to a pressure pulse of appropriate magnitude, the bellows 72 expands away from the wall 71 to which it is secured at one end, and forces a lever member 74 to rotate about a loose pivot formed by the output shaft 14. When the lever member 74 rotates, it carries with it a spring pawl 76 one end of which is firmly secured to the lever member 74 by two small rivets 75. This spring pawl 76 is pressed by its own spring tension into engaged contact with one tooth of a ratchet wheel 78, the center of which is firmly secured to the output shaft 14. Movement of the spring pawl 76 in response to expansion of the bellows 72 forces the ratchet wheel 78 to rotate about and thereby carry with it the output shaft 14.

When the pressure pulse entering through the input passage 70 subsides, the lever member 74 is forcibly returned to its initial position by the action of a compression spring 80 which is secured between the lever member 74 and the opposite housing wall 79. The ratchet wheel 78 is, however, restrained from returning to its initial position by a second spring pawl 82 which is attached to a support member 84 and urged toward engagement with the teeth of the ratchet wheel 78 by its own spring tension. Support member 84 is in turn secured to a cover plate (not shown) which fits the external outline shape of the pulse receiver unit and serves to protect the operating mechanism from damage.

On returning to its initial position, the lever member 74 brings with it the spring pawl 76, the end of which slides along the periphery of the ratchet wheel 78 until it comes into engaged contact with the next succeeding tooth on the ratchet wheel 78, and placing it in condition to drive the ratchet wheel forward in response to the next pressure pulse received from the transmitter. One end of the lever member 74 is positioned within a channel 77, cut in the lower wall (as shown in the drawing) of the receiver housing, so that the two opposing edges of the channel 77 serve as stops to prevent the lever member 74 from moving the ratchet wheel 78 more than one tooth forward on the expansion cycle, and to gauge the movement of the spring pawl 76 such that it will slide over only one tooth of the ratchet wheel 78 on the compression cycle.

Each pressure pulse arriving from the transmitter unit 2 advances the ratchet wheel 78 one tooth in a positive manner, with no slip back. The ratchet wheel 78 is firmly secured to the output shaft 14, which in turn is connected by suitable linkages to the chart drive shaft of a recorder, so that the periodic pulses generated by the transmitter unit drive the recorder chart at a constant average speed in synchronism with the synchronous motor 52.

Although a specific embodiment of the invention is disclosed herein, it is desired to emphasize that this is to be taken as merely illustrative and not limiting. Other embodiments will be apparent to those skilled in the art. For example, although the system described uses gas or air as the pulse transmission medium, it is clear that the same objective can be obtained by the use of a liquid. In such an arrangement, a solenoid operated piston-type pump might be keyed at periodic intervals by a regulated master timer. The pulses of liquid pressure could be used to expand a bellows, as in the system described above, or might be used to actuate a diaphragm or other means of converting pressure into motion.

It can be seen that the invention described herein achieves the objectives set forth. The synchronized pneumatic chart drive apparatus is exceedingly simple, inexpensive, and capable of providing a long operating life without maintenance or adjustment. Elimination of the usual synchronous motor in each recorder will obviate the expense of such motors and of providing individual explosive-proof housings, and will reduce substantially the possibility of damage from electrically-initiated explosions.

I claim:

1. For use with industrial recorders of the chart type, a centrally-controlled pulse energy system adapted for synchronously driving a plurality of recording charts whereby all of said charts are caused to be moved substantially in unison concurrently with the passage of specific time intervals measured by a coordinating master timer, comprising, in combination, a pressure pulse transmitter including a pneumatic relay, a flapper-nozzle valve associated with said relay, a source of gas under pressure communicating with said relay, spring means urging said flapper toward said nozzle, a rotatable cam operable to actuate said flapper intermittently at time-spaced intervals to open said flapper nozzle valve, means for driving said cam at a constant rate of speed, said relay including valve means arranged to move from closed to open position as said flapper moves away from and toward said nozzle in conformance with the rotation of said cam, a pressure output line for said relay, said valve means being adapted to control the flow of gas from said source and to produce sharply defined pulses of gas pressure in said output line as said flapper-nozzle valve is opened and closed, a plurality of pulse receivers each including means for converting received gas pressure pulses into mechanical motion, an output mechanism for each of said receivers and connectible to a chart drive load, and means for conveying pulses of gas pressure from said transmitter to said receivers.

2. A drive system for recorder charts and the like comprising, in combination, a pressure pulse transmitter including a pneumatic relay having a nozzle and cooperating flapper arm, a rotatable cam having raised portions thereon and operable to move said flapper arm with respect to said nozzle at periodic timed intervals to generate a continuous series of sharply defined gas pressure pulses, a synchronous motor for driving said cam, a source of gas under pressure connected to said transmitter, a pressure pulse receiver including a bellows responsive to received pulses of gas pressure for providing unidirectional rotary motion in discrete steps on an output shaft element, a ratchet wheel positioned within said receiver and positively secured to said output shaft element for imparting rotary motion thereto, a first spring pawl under the control of said bellows and having a tip portion normally engaged with one tooth of said ratchet wheel to drive said wheel and shaft in a forward direction when said bellows expands in response to a received pulse of gas pressure, a second spring pawl operable to restrain motion of said ratchet wheel in a direction opposite to motion imparted by said first spring pawl, spring means associated with said first pawl to compress said bellows after said pressure pulse has subsided and thereby to reposition said pawl tip portion into engagement with the next adjacent tooth on said ratchet wheel, and means for conveying pressure pulses from said transmitter to said receiver.

3. For use with a pneumatic pulse drive system wherein a centrally-timed pulse transmitter synchronously controls the movement of a plurality of industrial recording charts such that all charts under the control of said system are advanced periodically and substantially simultaneously an amount corresponding to elapsed time as measured by a master timer, a pulse receiver comprising, in combination, a housing, conduit means in one wall of said housing and adapted for attachment to a pipe carrying sharply defined pulses of gas under pressure, a bellows mounted in said housing and having an opening in one end for connection to said conduit means, a ratchet wheel rotatably mounted in said housing, an output shaft centrally secured to said ratchet wheel and extending through said housing wall for attachment to the motion element of a recording chart drive mechanism, a lever member loosely pivoted for rotary movement about said output shaft and engageable along one side thereof with the movable end of said bellows, a first spring pawl integrally secured to said lever member and having its tip end normally in engagement with one tooth on the periphery of said ratchet wheel for driving said ratchet wheel in one direction when said bellows expands in response to a sharply defined pulse of gas pressure from said transmitter, a second spring pawl having its tip portion normally in engagement with another tooth on said ratchet wheel and operable to restrain motion of said wheel in a direction opposite to the direction of motion caused by said first spring pawl, spring means associated with said first pawl to compress said bellows after said pressure pulse has subsided and thereby to cause the tip portion of said first pawl to slide over the peripheral surface of said wheel and to come into engagement with the tooth next adjacent said one tooth, first stop means engageable with said lever member to prevent said first spring pawl from moving said ratchet wheel more than one tooth forward in response to the expansion of said bellows, and second stop means engageable with said lever member to prevent said first spring pawl from sliding over more than one tooth on the periphery of said ratchet wheel when said bellows is compressed by said spring means after the pressure pulse has subsided.

4. A pulse receiver as claimed in claim 3, wherein said first and second stop means comprise, respectively, the two opposing sides of a channel formed in the interior surface of said housing wall, and wherein one end of said lever member extends into said channel and alternately engages the sides thereof as said bellows expands and contracts, thereby limiting the motion of said first spring pawl to the required travel span.

References Cited in the file of this patent

UNITED STATES PATENTS

| | | |
|---|---|---|
| 1,254,259 | More | Jan. 22, 1918 |
| 2,491,361 | Burdick | Dec. 13, 1949 |